United States Patent [19]

Wakui

[11] Patent Number: 4,882,640
[45] Date of Patent: Nov. 21, 1989

[54] RECORDING AND REPRODUCING APPARATUS USING RECORDED NUMERAL INFORMATION SIGNALS FOR PROGRAM DETECTION

[75] Inventor: Tetsuya Wakui, Chiba, Japan

[73] Assignee: Canon Kabushiki Kaisha, Tokyo, Japan

[21] Appl. No.: 43,936

[22] Filed: Apr. 29, 1987

[30] Foreign Application Priority Data

May 15, 1986 [JP] Japan .................................. 61-109687

[51] Int. Cl.$^4$ .............................................. G11B 15/52
[52] U.S. Cl. .................................. 360/73.05; 360/72.2; 360/73.08
[58] Field of Search ....................... 360/73, 74.4, 72.1, 360/72.2

[56] References Cited

U.S. PATENT DOCUMENTS

| | | | |
|---|---|---|---|
| 4,628,377 | 12/1986 | Harigaya | 360/72.1 |
| 4,635,144 | 1/1987 | Goto et al. | 360/72.2 |
| 4,646,167 | 2/1987 | Denecke | 360/72.2 |
| 4,663,678 | 5/1987 | Blum | 360/72.2 |
| 4,675,753 | 6/1987 | Takayama et al. | 360/27 |

*Primary Examiner*—Robert S. Tupper
*Attorney, Agent, or Firm*—Robin, Blecker, Daley & Driscoll

[57] ABSTRACT

A recording and reproducing apparatus for recording and reproducing main information consisting of a plurality of programs longitudinally on and from a tape-shaped recording medium is arranged to have time information recorded along with the main information on the recording medium indicating a length of time from the beginning of each of the programs; and to control the travel of the recording medium on the basis of the time information reproduced from the recording medium.

9 Claims, 7 Drawing Sheets

FIG.7(a)
PRIOR ART

| MODE \ ID | ID0 | ID1 | ID2 | ID3 | ID4 | ID5 | |
|---|---|---|---|---|---|---|---|
| 1 | 1 | HOUR | MIN. | SEC. | File/No. | Y | COUNTER |
| 2 | 2 | Pro./No. | Cut/No. | MIN. | SEC. | Y | CUT DATA |
| 3 | 3 | YEAR | MONTH | DAY | DAY OF WEEK | Y | TIME |
| 4 | 4 | HOUR | MIN. | SEC. | FILE/NO. | Y | TIME |
| 5 | 5 | Pro./No. | HOUR | MIN. | SEC. | Y | PRO. DATA |
| 6 | 6 | Pro./No. | HOUR | MIN. | SEC. | Y | TAPE DATA |

FIG.7(b)
PRIOR ART

| Bit No. | DATA ID5 (Y) IN EACH MODE |
|---|---|
| 0 | VALIDITY |
| 1 | AUDIO SIGNAL FORM |
| 2 | |
| 3 | L CH AUDIO, ETC. |
| 4 | R CH AUDIO, ETC. |
| 5 | START PART OF RECORDING |
| 6 | END PART OF RECORDING |
| 7 | PREVENTION OF DUBBING |

RECORDING AND REPRODUCING APPARATUS USING RECORDED NUMERAL INFORMATION SIGNALS FOR PROGRAM DETECTION

BACKGROUND OF THE INVENTION

1. Field of the Invention

This invention relates to a recording and reproducing apparatus for recording main information consisting of a plurality of programs on a tape-shaped recording medium in the longitudinal direction of the medium and for reproducing the recorded main information.

2. Description of the Related Art

In the field of magnetic recording, high density recording has recently come to be pursued. This trend has brought about, among others, a method of digitally recording an audio signal which is compressed in the directions of amplitude and time base thereof. In the case of a magnetic recording and reproducing apparatus of the rotary two-head helical scanning type (hereinafter referred to as a VTR), for example, a magnetic tape has generally been arranged to be wrapped at least 180 degrees round a rotary cylinder. Whereas, in accordance with this digital recording method, the tape is wrapped more than 180 (180 +) degrees including an extra wrapping part; and in this extra part is recorded an audio signal which is pulse code modulated (PCM) and time-base compressed.

FIG. 1 of the accompanying drawings shows a tape transport system of the above stated type VTR. FIG. 2 shows recording tracks formed on a magnetic tape by the VTR which is arranged as shown in FIG. 1.

Referring to FIGS. 1 and 2, the illustrations include a magnetic tape 1; a rotary cylinder 2; heads 3 and 4 which are mounted on the rotary cylinder 2 with a phase difference of 180 degrees between them and which have different azimuth angles; an area 5 within which a video signal is recorded in each of recording tracks formed on the magnetic tape 1 (hereinafter referred to as a video area); an area 6 within which an audio signal is recorded in each track (hereinafter referred to as an audio area). The video area 5 is formed with a portion of the magnetic tape which corresponds to a 180 degree wrapped portion of the whole circumference of the rotary cylinder 2 traced by the heads 3 and 4. The audio area 6 is formed with a portion of the tape corresponding to a $\theta$ degree portion of the circumference of the rotary cylinder 2 traced by the heads 3 and 4.

In accordance with another known method, a VTR of the above stated type is arranged to have an audio signal which differs from the audio signal recorded in the audio area 6 recorded also in the video area 5. More specifically, the method is based on the following concept: Assuming that the degree $\theta$ is 36°, five audio areas each of which is the same as the audio area 6 are obtainable in addition to the area 6. Then, in each of these audio areas, an audio signal can be recorded in a pulse code modulated (PCM) state. FIG. 3 shows a tape transport system of a recording and reproducing apparatus which is arranged to record and reproduce such multi-channel audio signals. FIG. 4 shows the recording tracks formed on a tape by the apparatus arranged as shown in FIG. 3.

In recording the PCM audio signal on a tape, the audio signal undergoes a non-linear compressing process while it is in an analog signal state. The compressed analog audio signal is band restricted to 0 to ½ sampling frequency (fs) by means of a low-pass filter. The band restricted audio signal is then converted into digital data of ten bits by means of an analog-to-digital (A/D) converter. The ten-bit data is non-linearly compressed into digital data of eight bits. The eight-bit data undergoes a series of error preventing processes including an interleave process, a CRCC process and a parity word adding process. The data is thus pulse code modulated and is then recorded on the magnetic tape. During reproduction, the PCM audio data thus recorded is taken out by means of a bit clock which is locked at data formed by a phase locked loop (PLL). The data thus taken out undergoes an error detecting CRCC process and an error correcting process by parity. The data is thus expanded from the eight-bit state to a ten-bit data. The ten-bit data is converted into an analog signal by means of a digital-to-analog (D/A) converter. The analog signal is then subjected to an analog expansion process carried out through a post-filter to become an audio signal.

FIG. 5 is a block diagram showing an arrangement for carrying out the signal processing operation described in the foregoing. Referring to FIG. 5, a block 11 is arranged to compress the incoming analog audio signal in the direction of amplitude of the signal. A pre-filter (LPF) 12 is arranged to impose a band restriction on the analog audio signal. An A/D converter 13 is arranged to A/D convert the signal into a ten-bit data. A block 14 is arranged to compress the ten-bit data into eight-bit data. A block 15 is arranged to add to the eight-bit data such redundant bits as a CRCC and a parity word. A block 16 is arranged to perform a PCM operation. The arrangement includes a memory 17; a magnetic recording and reproducing system 18; a PCM demodulation block 19; a memory 20; a block 21 arranged to perform error detecting and correcting processes and an interpolating process; a block 22 arranged to expand the eight-bit data into data of ten bits; a D/A converter 23; an LPF 24 which is a post-filter; a block 25 arranged to expand the analog signal produced from the LPF 24; and a clock pulse generator 26.

An example of a data format conventionally employed for an apparatus of the kind described above is arranged as follows: FIG. 6 shows the data format in which data is recorded within each track included in each of the areas shown in FIG. 4. More specifically, this is a data format containing PCM audio data corresponding to an audio signal for two-channels of 1/60 sec.

In the data matrix which is shown in FIG. 6, a column SYNC is for synchronizing data. A column ADDRESS is for address data. Columns P and Q are for redundant data. A column CRCC is for CRCC (cyclic redundancy check code) data which is well known. Each of columns D1 and D2 consists of a plurality of data columns. These data columns contain audio signal information of two channels. The data matrix includes rows b(0) to b(3x-1). Each of these rows forms one data block. The data of each data block are recorded one after another from the left-hand side to the right-hand side as viewed on the drawing. For example, after the data of the column SYNC in the row b(0) is recorded, the data of the column ADDRESS in the row b(0) is recorded. Then, the data of the column P in the row b(0) is recorded. Further, after the data of the last column in the row b(x) is recorded, the data of the column SYNC in the row b(x+1) is recorded. Data recording in one track comes to an end when the data of the last column in the row b(3x-1) is recorded.

In the first of the plurality of columns included in the column D1, six data ID0 to ID5 in the rows b(0), b(1), b(x), b(x+1), b(2x), b(2x+1) represent additional information other than the audio signal information (hereinafter these six data are referred to as ID data).

The multi-channel PCM audio signal recording and reproducing apparatus readily permits audio signal recording over a period of 90 minutes and thus permits recording for nine hours on a single tape. However, the result of such recording necessitates a long period of time in finding what is recorded where on the tape. To solve this problem, it has been contrived to generate ID data specially for facilitating a look-up operation when the data corresponding to the audio signal is recorded and to record the generated ID data in a specific position within each of recording tracks on the tape. An example of the look-up ID data has been disclosed in U.S. Pat. Application Serial No. 816,425, filed by the present applicant. It is conceivable to provide such look-up ID data, for example, by setting a flag at a part corresponding to a blank (mute) part between one program and another or by recording a program number for each of the programs.

However, with the ID data arranged in that manner, in detecting the flag between the programs or in detecting the program number, the rotary head might come to trace a wrong track which is oppositely azimuth recorded on the recording medium or tape. Therefore, it is not always possible to detect a change-over part between programs or the leader part of a program by one tracing action of the head. Further, if an attempt is made to shorten the length of time required for look-up by increasing the travelling speed of the tape during a look-up operation, it generally becomes impossible to accurately detect the look-up ID data. Besides, the tape cannot be always brought to a stop at a desired point due to the force of inertia.

SUMMARY OF THE INVENTION

This invention is directed to the solution of the above stated problem of the prior art. It is therefore a general object of this invention to provide a recording and reproducing apparatus which facilitates detection of a change-over part between one program and another.

It is a more specific object of this invention to provide a recording and reproducing apparatus which is capable of promptly and accurately detecting the leader part of each of programs recorded on a tape and bringing the tape to a desired position thereof.

Under this object, a recording and reproducing apparatus arranged according to this invention as an embodiment thereof comprises recording means for recording on a recording medium a main information signal and time information which indicates a length of time from the beginning of each program of the main information signal; moving means for moving the recording medium; reproducing means for reproducing from the recording medium the main information signal and the time information; and control means for controlling the moving means on the basis of the time information reproduced by the reproducing means.

It is another object of this invention to provide a reproducing apparatus of the kind reproducing main information from a recording medium on which time information indicative of a length of time from the beginning of each program is recorded along with the main information, wherein there is provided an arrangement which facilitates look-up for each of the programs.

Under that object, a reproducing apparatus for reproducing a main information signal from a recording medium on which time information indicative of a length of time from the beginning of each of the programs of the main information signal is recorded along with the main information signal comprises moving means for moving the recording medium; reproducing means for reproducing the time information from the recording medium; and control means for controlling, on the basis of the time information reproduced by the reproducing means, the moving speed at which the moving means moves the recording medium.

These and further objects and features of this invention will become apparent from the following detailed description of an embodiment thereof taken in connection with the accompanying drawings.

BRIEF DESCRIPTION OF THE DRAWINGS

FIGS. 7(a) and 7(b) show a format of additional information data included in the data format of FIG. 6.

DETAILED DESCRIPTION OF THE PREFERRED EMBODIMENT

Figure 1:
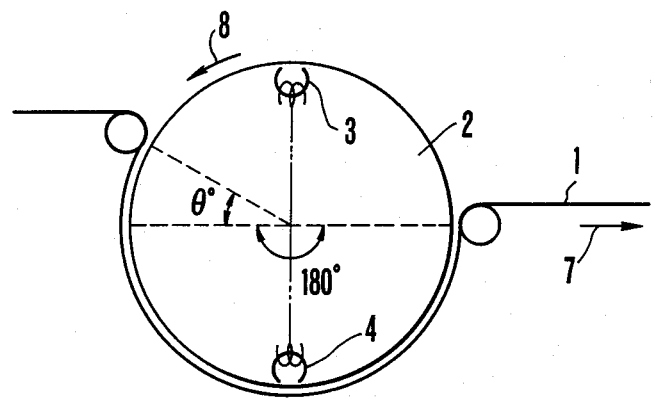
FIG. 1 is a schematic illustration of the tape transport system of the conventional VTR.
Figure 2:
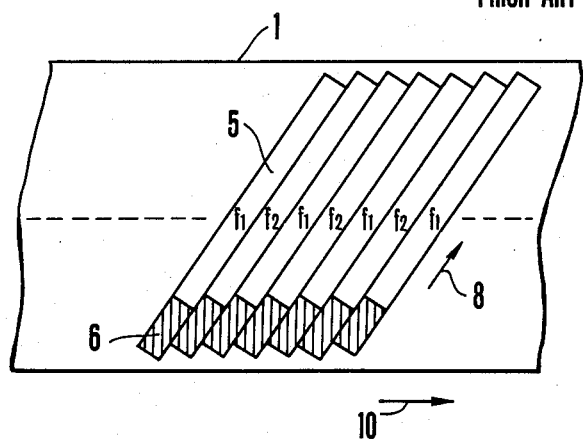
FIG. 2 shows recording tracks formed on a magnetic tape by the VTR of FIG. 1.
Figure 3:
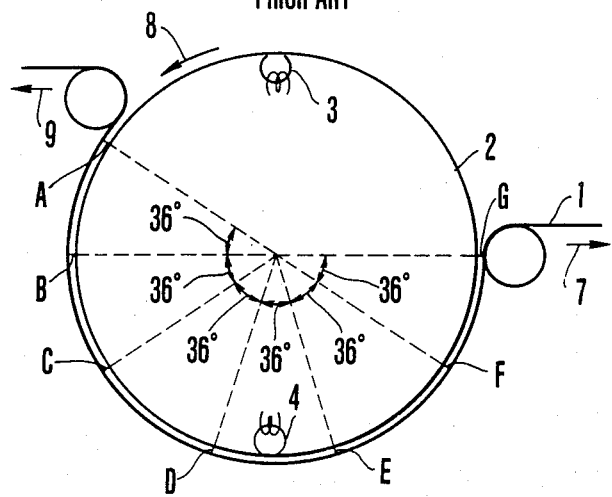
FIG. 3 is the tape transport system of the conventional multi-channel audio recorder.
Figure 4:
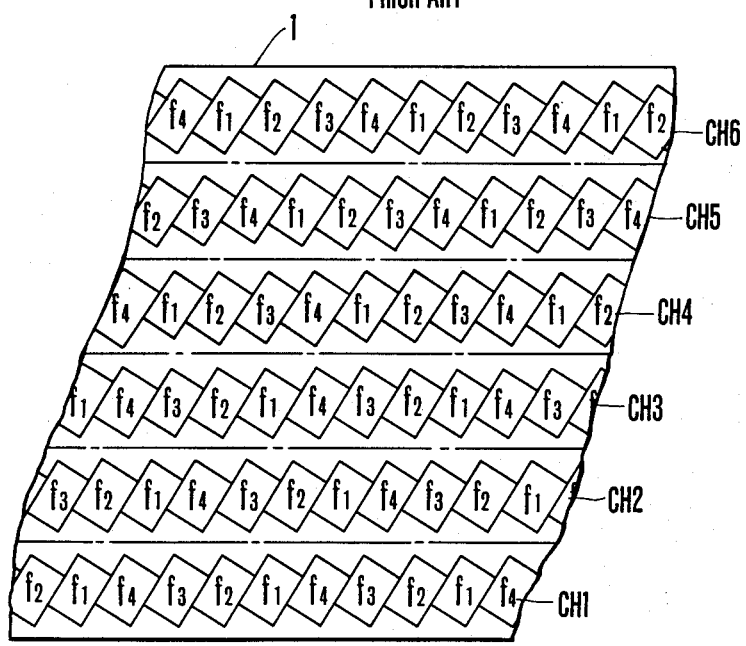
FIG. 4 shows recording tracks formed on a magnetic tape by the recorder of FIG. 3.

Before describing an embodiment of this invention, an ID data format to which this invention is applicable is described as follows: FIGS. 7(a) and 7(b) show the conventionally employed format for additional information data. Referring to FIG. 7(a), data ID0 consists of eight bits which indicate the kinds of information to which data ID1 to ID5 correspond. In other words, the data ID0 is main mode designating data. There are six different modes 1 to 6. In each of these modes, the data ID1 to ID4 indicate information as shown in FIG. 7(a). In other words, the data ID1 to ID4 show time information as a tape counter in the mode 1. They show time information for each cut in the mode 2. They show hour information in the modes 3 and 4. They show time information on a length of time from the leader part of each program in the mode 5. They show time information on a length of time from the leader of the tape in the mode 6. In FIG. 7(a), a word "Pro./No." means a program No.; "Cut/No." means a cut No.; and "File/No." means a file No. Further, in FIG. 7(a), a symbol Y denotes data of eight bits indicating information the details of which are as shown in FIG. 7(b). Referring to FIG. 7(b), the fifth and sixth bits indicate a recording start part and a recording end part and respectively becomes "1" at the start and end points of recording of each program of the audio signal. Further, in the modes 5 and 6, the data ID0 shows information on recording format; the data ID1 is data of eight bits indicative of a program number; the data ID2 and ID3 show hour and minute information; and the data ID4 shows information on second.

In the case of the embodiment, this invention is applied to a recorder which is arranged to have the ID data recorded and reproduced in the above stated mode 5.

Figure 5:
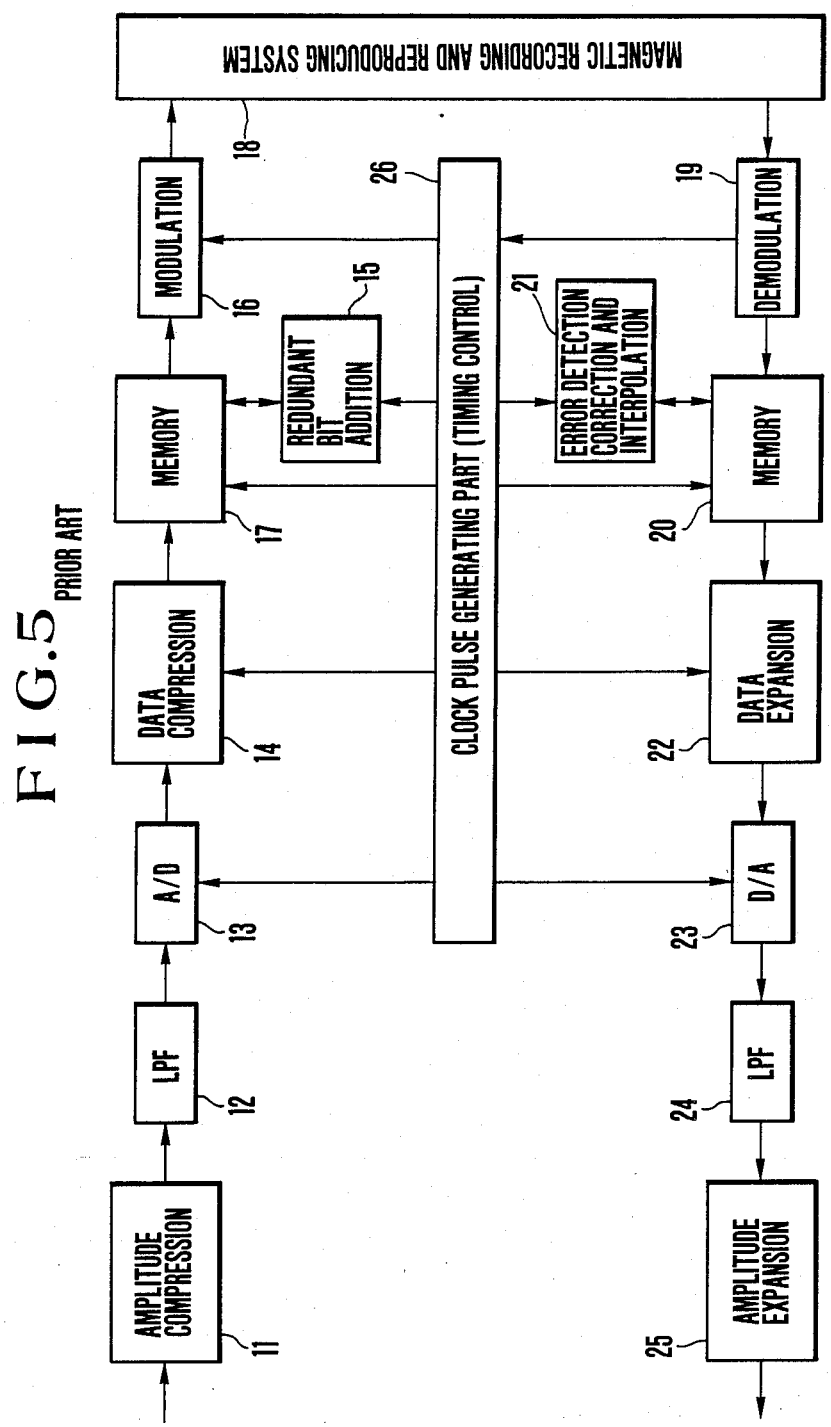
FIG. 5 is a block diagram showing a PCM audio signal processing of the recorder of FIG. 3.
Figure 6:
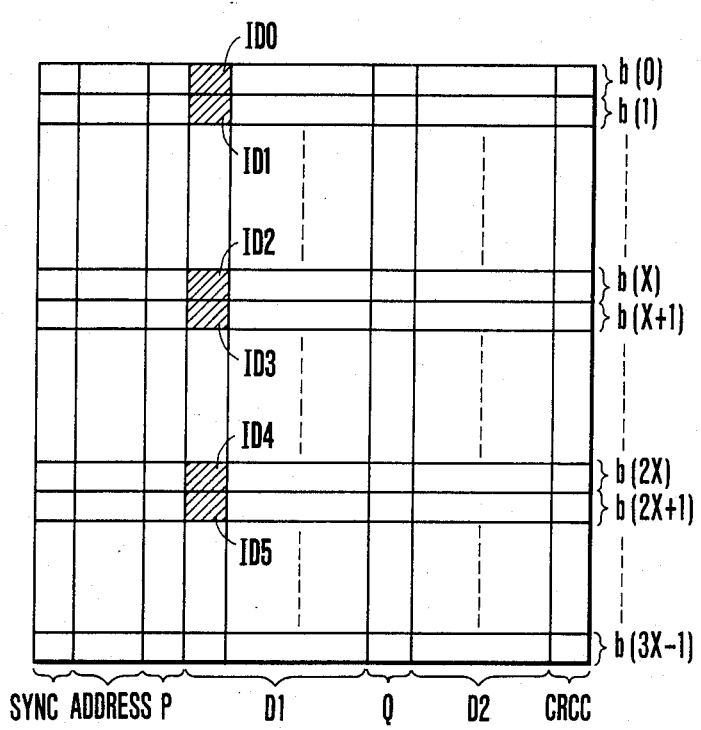
FIG. 6. is an illustration of a recording data format for one track employed by the recorder of FIG. 3.
Figure 8:
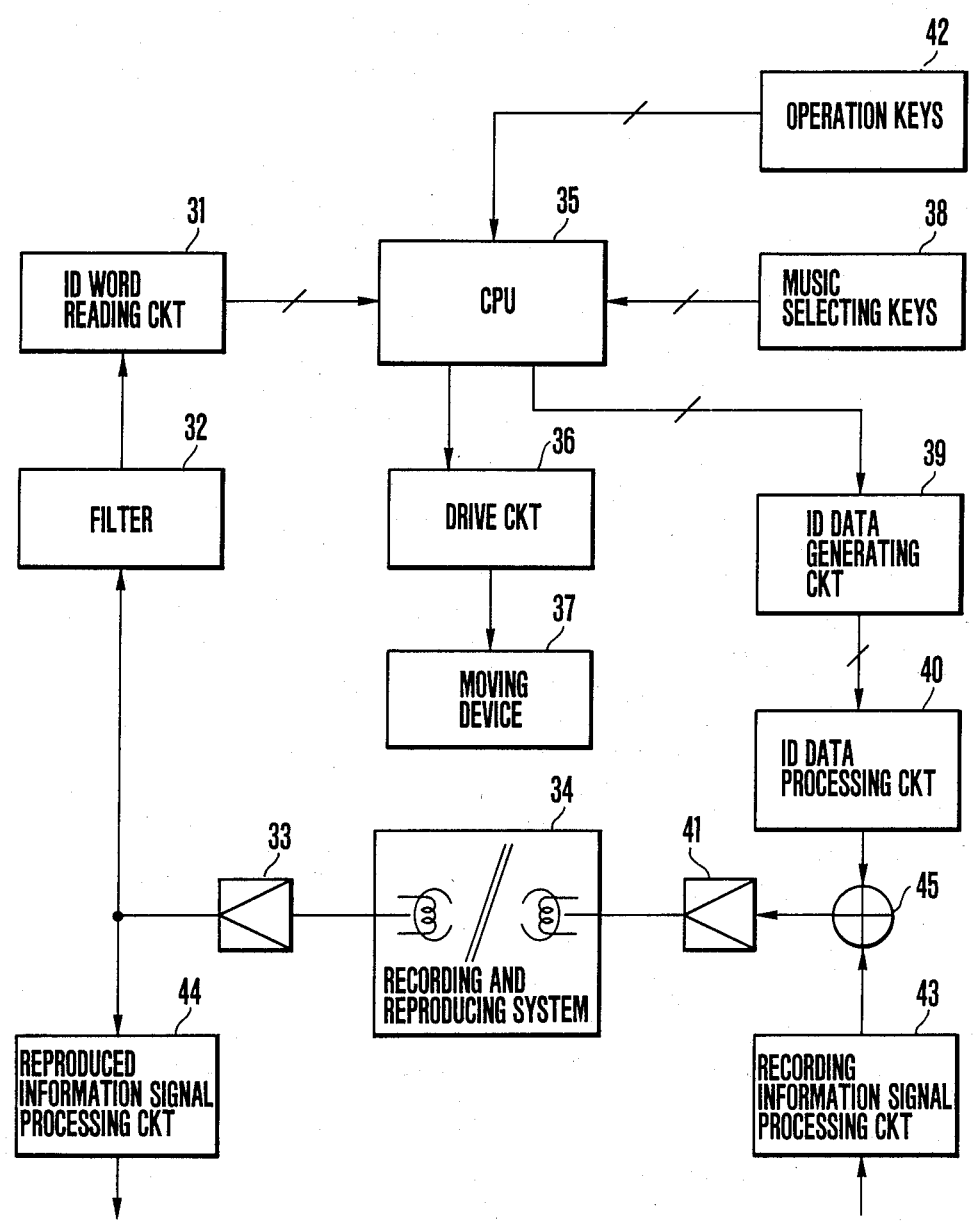
FIG. 8 is a block diagram showing in outline the arrangement of essential parts of a tape recorder embodying this invention.

FIG. 8 shows in a block diagram the arrangement of a multi-channel audio signal recording and reproducing apparatus embodying this invention. Referring to FIG. 8, an ID word reading circuit 31 is arranged to read out an ID word recorded on the tape and to convert it into a code readable by a micro-computer or CPU 35. A filter 32 is arranged to take out only ID data from a reproduced signal produced from a head amplifier 33. The head amplifier 33 is arranged to amplify a signal produced from a head. A recording and reproducing system 34 corresponds to the block 18 of FIG. 5 and includes a rotary head. A drive circuit 36 is arranged to drive a tape moving device such as a capstan, etc. A tape moving device 37 is arranged to move the tape. Music selecting keys 38 are provided for setting a music selecting number. An ID data generating circuit 39 is arranged to generate the ID data mentioned in the foregoing in recording an audio signal. An ID data processing circuit 40 is arranged to perform a signal processing operation on the ID data generated by the ID data generating circuit 39 and to make the data into a state recordable on the tape. A recording amplifier 41 is arranged to amplify the ID data and audio data for recording. Operation keys 42 are arranged to enable the operator to give an instruction to the recording apparatus to operate. A recording audio information signal processing circuit 43 is arranged to include therein the blocks 11 to 17 which are shown in FIG. 5. A reproduced audio information signal processing circuit 44 is arranged to include the blocks 19 to 25 shown in FIG. 5. A multiplexing circuit 45 is arranged to multiplex the ID data and the audio data together.

Figure 9:
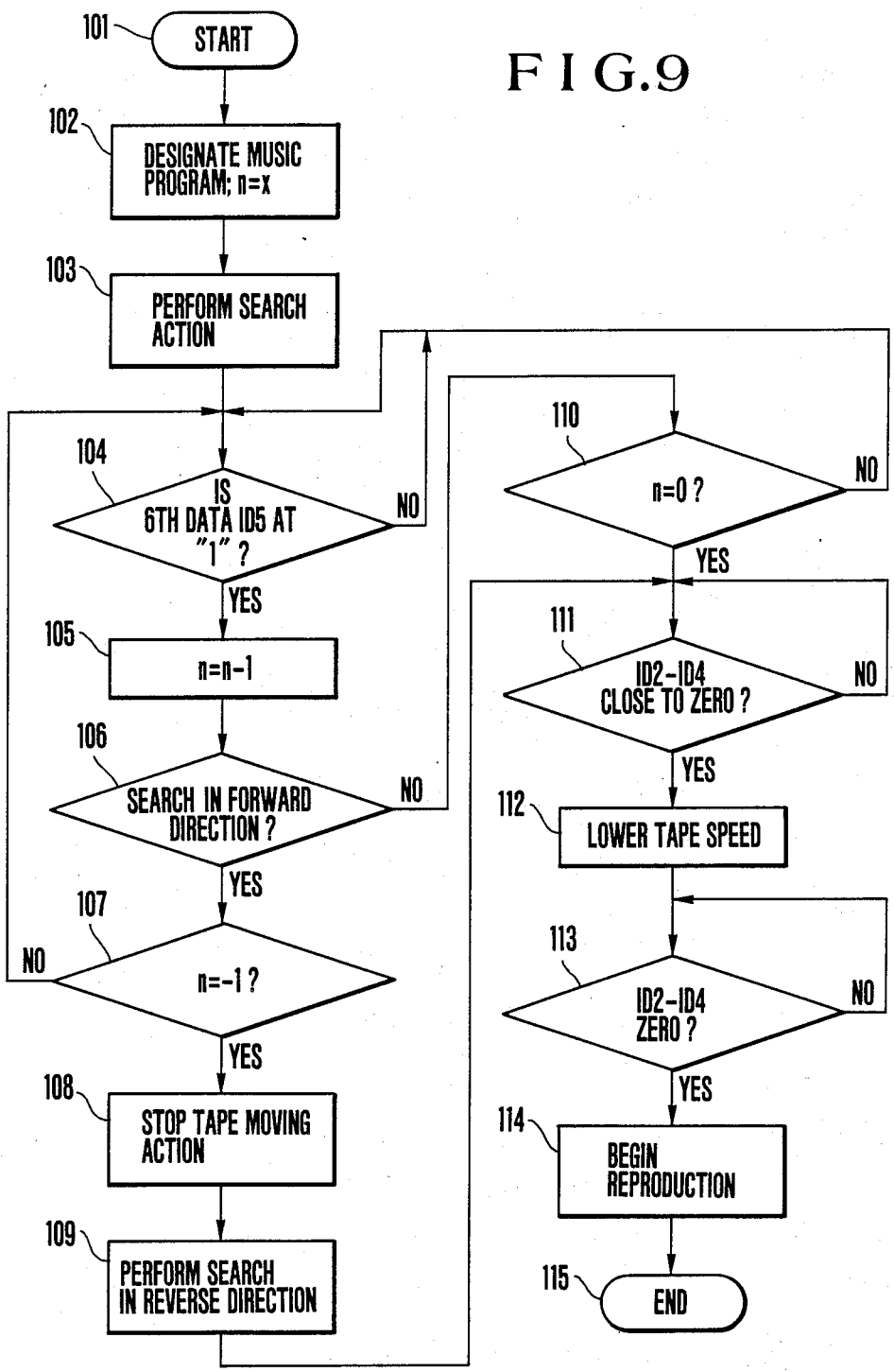
FIG. 9 is a flow chart showing the program look-up operation to be performed by a CPU shown in FIG. 8.

During a program look-up operation, the CPU 35 of the recording and reproducing apparatus which is arranged as described above controls the drive circuit 36 on the basis of the ID data read out by the ID word reading circuit 31, music or program selecting designation data obtained from the music selecting keys 38 and data obtained from the operation keys 42. Under this control of the CPU 35, the drive circuit 36 drives the tape-shaped recording medium moving device 37 which includes the capstan, etc. FIG. 9 shows in a flow chart the operation of the CPU 35 of FIG. 8 to be performed in looking up a program or programs. The embodiment is arranged to perform a look-up operation as described below with reference to the flow chart of FIG. 9:

When an instruction is given for look-up by means of the operation keys 42, the embodiment begins to operate at a step 101 as shown in FIG. 9. With a program designating action performed by the operator at a step 102, a number x of programs to be skipped over is designated by means of the music selecting keys 38 and is set at n. The number n is stored. At a step 103, a search or look-up mode obtains. The drive circuit 36 and the moving device 37 are operated to cause the tape to travel at a speed about 20 times as high as the tape travel speed which is employed in recording. At this step, if the sixth bit of the data ID5 shown in FIG. 7(b) is at "1", this indicates a beginning part of the program. At a next step 104, if this bit value "1" is detected by the ID word reading circuit 31, the initial setting number n representing a number of music programs is decreased by one at a step 105. At a step 106, a check is made to find whether the search is being made in the forward direction which is the same as the tape travel direction for recording or in a direction reverse to the recording direction. If the search is found to be in the forward direction, a check is made to see if there obtains a state of $n = -1$ at a step 107. If so, the moving device 37 is brought to a stop at a step 108. At a step 109, the searching direction is reversed by moving the recording medium (or the tape) in the reverse direction. If the number of skipping programs is found not $n = -1$ at the step 107, the flow of operation comes back to the step 104 and the steps are repeated until it becomes $n = -1$. If the search or look-up is found not in the forward direction but is in the reverse direction at the step 106, the search continues until the number n becomes zero. When there obtains a state of $n = 0$ at a step 110, the flow of operation comes to a step 111. At the step 111, the time information represented by the data ID2 to ID4 indicating a length of time from the beginning of the program is read out. If it indicates any value that is closer to zero than a predetermined value, say, 30 sec, the CPU produces an instruction at a step 112 to lower the speed at which the recording medium is being moved. At a step 113, a low speed search is continuously made until the information on the length of time from the leader part of the program becomes zero by causing the tape to be moved at a speed about five times as high as the recording tape travel speed. When the value of the time information becomes zero, the apparatus is brought into an audio signal reproducing state by changing the tape (recording medium) moving speed to a speed which is the same as the recording speed at a step 114. The flow of operation comes to an end at a step 115. The recording and reproducing apparatus shown in FIG. 8 is thus arranged to be capable of promptly and accurately looking up a desired program by carrying out the above stated steps 101 to 115.

While the embodiment described is arranged to perform a look-up operation by simply skipping over several programs, the embodiment can be arranged to be capable of carrying out a random program reproduction in a desired selecting sequence of programs by enlarging the music selecting keys 38 and the memory of the CPU 35. Further, the embodiment also can be arranged to be capable of continuously reproducing any desired part only with some ID data that corresponds to the desired part of record of information recorded during the recording operation.

In the specific embodiment described, the invention is applied by way of example to a digital audio tape recorder; and digital data of time information indicative of a length of time from the beginning of each program is arranged to be recorded along with digital audio data. However, this arrangement may be changed to have the data of time information recorded in a separate area from a main information signal such as a video signal or an audio signal.

In accordance with this invention, as described in the foregoing, the time information on a length of time from the beginning of each program is recorded on the recording medium along with the main information; and the travel of the recording medium is controlled on the basis of the time information reproduced from the medium. The apparatus according to this invention is therefore capable of accurately detecting any desired program from among others and is also capable of shortening a length of time required before bringing the recording medium to a stop.

What is claimed is:

1. A reproducing apparatus for reproducing main information signals from a tape-shaped record bearing medium on which numeral information signals indicative of positions on said medium are recorded, the numeral value of said numeral information signals successively varying along the longitudinal direction of said tape-shaped record bearing medium, comprising:
   (a) moving means for moving said tape-shaped record bearing medium, in the longitudinal direction;
   (b) reproducing means for reproducing from said recording medium said main information signals and said numeral information signals;
   (c) manually operable means for instructing said apparatus to look up a desired position of said tape-shaped record bearing medium;
   (d) a first control means for setting the medium moving speed of said moving means to a first speed in response to look-up instruction given by said manually operable means;
   (e) a second control means for changing the medium moving speed of said moving means from said first speed to a second speed which is slower than said first speed in response to that a difference between a desired value corresponding to the desired position and the numeral value of said numeral information signals reproduced by said reproducing means becomes less than a predetermined value; and
   (f) a third control means for changing the medium moving speed of said moving means from said second speed to a third speed which is slower than said second speed in response to that a difference between the desired value and the numeral value of said reproduced numeral information signals becomes zero, said tape-shaped record bearing medium being moved at the third speed while said main information signals are recorded.

2. An apparatus according to claim 1, wherein said third control means is arranged to set said reproducing means reproducing said main information signals.

3. An apparatus according to claim 1, wherein the numeral informations indicate elapsed recording times.

4. An apparatus according to claim 3, wherein the numeral informations indicate a length of time from the beginning of each program of said main information signals.

5. An apparatus according to claim 4, wherein said desired position is a starting position of recording each program of said main information signals on said tape-shaped record bearing medium.

6. An apparatus according to claim 4, wherein the desired value is zero.

7. An apparatus according to claim 1, wherein said reproducing means includes a rotary head which is arranged to obliquely trace on said tape-shaped record bearing medium.

8. An apparatus according to claim 1, wherein said main information signal includes a digitized audio signal.

9. A reproducing apparatus for reproducing main information signals from a tape-shaped record bearing medium on which numeral information signals indicative of positions on said medium are recorded, the numeral value of said numeral information signals successively varying along the longitudinal direction of said tape-shaped record bearing medium, comprising:
   (a) moving means for moving said tape-shaped record bearing medium in the longitudinal direction;
   (b) reproducing means for reproducing from said recording medium said main information signals and said numeral information signals;
   (c) manually operable means for instructing said apparatus to look up a desired position of said tape-shaped record bearing medium;
   (d) a first control means for setting the medium moving speed of said moving means to a first speed in response to look-up instruction given by said manually operable means;
   (e) a second control means for changing the medium moving speed of said moving means from said first speed to a second speed which is slower than said first speed in response to that a difference between a desired value corresponding to the desired position and the numeral value of said numeral information signals reproduced by said reproducing means becomes less than a predetermined value; and
   (f) a third control means for setting said reproducing means reproducing said main information signals and for changing the medium moving speed to a third speed which is slower than said second speed, in response to that a difference between the desired value and the numeral value of said reproduced numeral information signals becomes zero.

* * * * *